O. W. DOOLITTLE.
LUBRICATOR.
APPLICATION FILED OCT. 8, 1918.
1,348,551.
Patented Aug. 3, 1920.
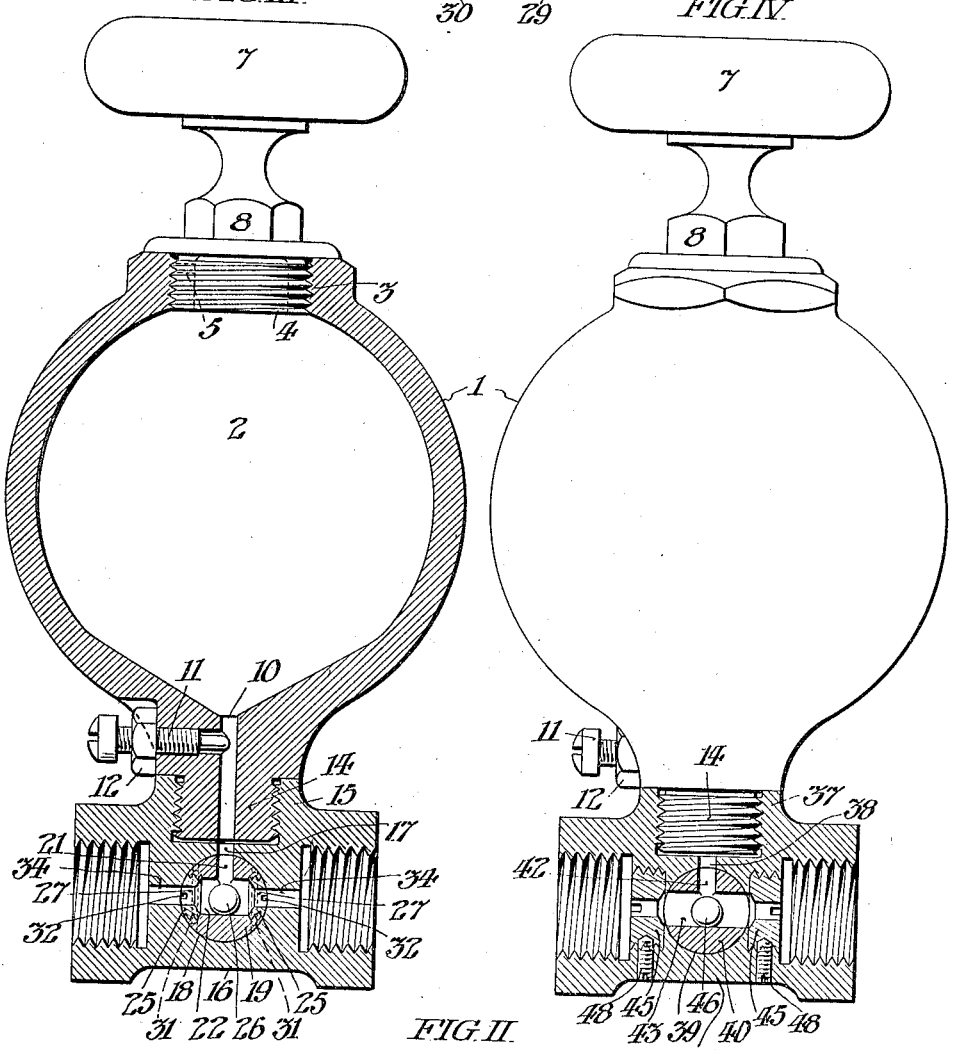
INVENTOR
ORSON W. DOOLITTLE,
ATTORNEY

UNITED STATES PATENT OFFICE.

ORSON W. DOOLITTLE, OF GLENSIDE, PENNSYLVANIA.

LUBRICATOR.

1,348,551.   Specification of Letters Patent.   Patented Aug. 3, 1920.

Application filed October 8, 1918. Serial No. 257,345.

*To all whom it may concern:*

Be it known that I, ORSON W. DOOLITTLE, a citizen of the United States, residing at Glenside, county of Montgomery, and State of Pennsylvania, have invented a certain new and useful Improvement in Lubricators, whereof the following is a specification, reference being had to the accompanying drawing.

The invention herein claimed is an improvement in lubricators of the class claimed in Letters Patent of the United States No. 1,221,295, granted to me April 3, 1917, designed to use dry graphite and including in the lubricant passageway a body adapted to be reciprocated by fluctuations in fluid pressure upon respectively opposite sides thereof. In said Letters Patent, I showed a form of the invention wherein the lubricator structure has but a single outlet for connection with the device which is to be lubricated. However, my present invention resembles the lubricator claimed in my copending application Serial No. 218,422 filed February 21, 1918, for Letters Patent of the United States, in that it has a T fitting with two opposite discharge openings from the lubricator; so that the latter may be directly included in an indicator line on a double acting engine cylinder and in communication with the opposite ends thereof, to supply lubricant alternately thereto. However, in the form of my invention shown in said application, the T fitting continuously maintains communication with both ends of the cylinder and, consequently, if it is desired to produce an indicator diagram for but one end of the cylinder, it is necessary to remove said T fitting and substitute some other fitting in connection with the indicator. Therefore, it is an object and effect of my present invention to provide a permanent indicator line with a T fitting and appurtenances adapted to interchangeably coöperate with a lubricator and with an indicator so that communication may be established through the T fitting from the lubricator or indicator to either end of the cylinder to the exclusion of the other end.

As hereinafter described; my present invention may include a rotary plug valve with a transverse passageway in which the reciprocatory body is mounted in coöperative relation with stationary abutments for said body having respective passageways through which the lubricant is discharged to the respectively opposite ends of the cylinder, and said abutments may be mounted either in the T fitting as in my application aforesaid, or in said rotary valve plug; which latter acts as a three way cock controlling communication between the receptacle in which the lubricant is stored and the opposite ends of the cylinder to which it is to be delivered.

My invention includes the various novel features of construction and arrangement hereinafter more definitely specified.

In the drawings: Figure I is a diagrammatic elevation of a double acting engine with a convenient embodiment of my invention applied thereto.

Fig. II is a central vertical transverse sectional view of the T fitting shown in Fig. I, showing the three way rotary plug valve, of which it is the casing.

Fig. III is a central vertical longitudinal sectional view of said fitting and the lubricant receptacle shown in Fig. I.

Fig. IV is a sectional view, in the same plane as Fig. III, but showing a modified form of T fitting, and with said receptacle in full lines.

In the form of my invention shown in Figs. I to III inclusive; the casing 1, which is the lubricant supply receptacle, includes the chamber 2 for lubricant, having the screw threaded lubricant inlet 3 at the top thereof; with the removable closure 4 whereby said inlet 3 may be manually sealed, and said closure has the duct 5, through which communication may be established with the atmosphere without entirely unscrewing said closure. Said closure may be conveniently rotated by means of the handle 7, preferably formed of some material which is nonconductive of heat, but said closure is also conveniently provided with the wrench hold 8.

Said casing 1 has at its lower end the vertical passageway 10 which is the lubricant discharge outlet port, the effective area of which may be varied by the screw valve 11, which may be set with its reduced inner end obstructing said port 10 more or less, and be securely held by the jam nut 12 which bears upon the lubricant casing 1. Said port 10 extends from the lubricant receptacle through the screw threaded nipple 14 at the lower end of said casing 1, which is adapted to fit the upwardly extending branch 15 of the T body 16, which is thus normally rigidly connected with said casing 1. Said body 16 has the port 17 registering with said port 10 and leading to the conical valve chamber 18 for the conical valve plug 19 which is rotary on a horizontal axis in said chamber 18 and has the handle 20 at its larger end, whereby it may be turned, to open and close the vertical passageway of said registered ports 10 and 17 leading from said chamber 2. Said valve plug 19 has the radial port 21, leading to the plunger valve chamber 22 which extends transversely in said rotary valve plug 19, and has the steel abutments 25 at the opposite ends thereof, to limit the reciprocatory movement of the spherical plunger body 26; which is reciprocated by fluctuations in fluid pressure alternately upon respectively opposite sides thereof in the indicator pipe line 28 upon the double acting engine 29, indicated in Fig. I, which includes the piston 30, the reciprocation of which causes such fluctuations. Such reciprocation of said body 26 alternately ejects the lubricant through the central ports 27 in the respective abutments 25, which are conically countersunk at their inner ends to facilitate the ejection of the lubricant by said body 26. As said abutments 25 are subjected to the hammer blows of said reciprocatory body 26; they are preferably provided with screw threads to secure them in said plug 19 and have means to prevent them from being accidentally unscrewed, conveniently the pins 31 which extend in said valve plug 19 in tangential engagement with said abutments 25, but may be readily driven out when it is desired to remove said abutments; the latter being provided with slots 32 for engagement with a screw driver.

When in position to dispense lubricant alternately to the opposite ends of said engine 29; said valve plug 19 has its radial port 21 registering with said port 17 and with its diametrically opposite radial ports 27, leading through said abutments 25, in registry with the ports 34 in said T body 16, which open into the respective branches of said pipe 28.

The form of my invention in Fig. IV differs from that above described only in that the rotary valve plug does not carry the abutments which limit the movement of the reciprocatory body by which the lubricant is forwarded to the opposite ends of the engine 29. In said figure; the T body 36 has the upwardly extending branch 37 adapted for connection with the lubricant casing 1, and has the port 38 for registry with the port 10 of said casing, like the T body 16 shown in Fig. II; but has the conical valve chamber 39 for the conical valve plug 40 which is rotary on a horizontal axis in said chamber 39, and has the radial port 42 leading to the plunger valve chamber 43 which extends transversely in said rotary valve plug 40 but does not carry the abutments 45 which limit the reciprocatory movement of the spherical plunger body 46. Said abutments 45 are conveniently screws, slotted to receive a screw driver by which they may be inserted and removed, but are normally stationary in said T body 36 in which they are normally held by the set screws 48.

In either form of my invention above described; it is only necessary to remove the lubricator casing 1 from the T fitting, 16 or 36, to substitute an ordinary pressure indicator in the line including said branch pipes 28; the sockets in said T bodies for the nipple 14 being of the usual size of the nipple connection of such an indicator. Moreover, said rotary valve plugs 19 and 40 may be turned with their respective valve chambers 22 and 43 extending vertically, and with their respective ports 21 and 42 extending toward either end of their respective T fittings, to establish communication from the indicator to either end of the cylinder, of the engine 29, to the exclusion of the other end.

Although I have shown my improved lubricator as provided with two outlets, for adaptation to the embodiment indicated in Fig. I; it is obvious that if one end of the respective valve chambers 22 and 43 were closed, the plunger valves 26 and 46 would still be operative to discharge lubricant in the opposite direction, as the result of fluctuations of pressure and consequent reciprocation of said bodies 26 and 46.

Therefore, I do not desire to limit myself to the precise details of construction and arrangement herein set forth, as it is obvious that various modifications may be made therein without departing from the essential features of my invention as defined in the appended claims.

I claim:

1. In a lubricator, the combination with a receptacle for lubricant having a screw threaded outlet at the bottom thereof; of a valve body having a vertical tubular branch fitted to said outlet, and two horizontally opposite tubular discharge branches; a conical valve chamber in said body, connected by a vertical port opening from said receptacle; means adjustable to vary the effective area of said port, including a screw extending transversely in said vertical branch, having its inner end adapted to obstruct said port more or less in accordance with the axial adjustment of said screw; means arranged to hold said screw in adjusted position; a rotary conical plug valve in said chamber, having a port extending radially therein, adapted to register with the port in said valve body, and a cylindrical valve chamber, extending transversely in said plug valve, in communication with said radial port; a spherical plunger valve in said transverse valve chamber, free to reciprocate therein; screw threaded abutments at respectively opposite ends of said last named valve chamber, each having a lubricant discharge port, adapted to register with one of said discharge branches; and conduits respectively extending from the opposite branches of said valve body and respectively communicating with opposite ends of the piston chamber in a double acting engine; whereby the last named valve is reciprocated to alternately discharge lubricant from said valve body into said conduits, by fluctuations in pressure incident to the operation of said engine, and said plug valve may be turned to shut off one of said discharge branches while maintaining the other in communication with said vertical branch.

2. In a lubricator, the combination with a receptacle for lubricant having a screw threaded outlet at the bottom thereof; of a valve body having a vertical tubular branch fitted to said outlet, and two tubular discharge branches; a conical valve chamber in said body, having a vertical port opening from said receptacle; means adjustable to vary the effective area of said port; a rotary conical plug valve in said chamber, having a transverse port adapted to register with the port in said valve body, and a valve chamber, extending transversely in said plug valve, in communication with said transverse port; a spherical plunger valve in said transverse valve chamber, free to reciprocate therein; abutments at respectively opposite ends of said transverse valve chamber, each having a lubricant discharge port, adapted to register with one of said discharge branches; and conduits respectively extending from the opposite branches of said valve body and respectively communicating with opposite ends of the piston chamber in a double acting engine; whereby said plunger valve is reciprocated to alternately discharge lubricant from said valve body into said conduits, by fluctuations in pressure incident to the operation of said engine, and said plug valve may be turned to close one of said discharge branches while maintaining the other in communication with said vertical branch.

3. In a lubricator, the combination with a receptacle for lubricant having a screw threaded outlet at the bottom thereof; of a valve body having a vertical tubular branch fitted to said outlet, and two tubular discharge branches; a conical valve chamber in said body, having a port opening from said receptacle; a rotary conical plug valve in said chamber, having a transverse port adapted to register with the port in said valve body, and a valve chamber, extending transversely in said plug valve, in communication with said transverse port; a plunger valve in said transverse valve chamber, free to reciprocate therein; abutments at respectively opposite ends of said transverse valve chamber, each having a lubricant discharge port, adapted to register with one of said discharge branches; and conduits respectively extending from the opposite branches of said valve body and respectively communicating with opposite ends of the piston chamber in a double acting engine; whereby said plunger valve may be reciprocated to alternately discharge lubricant from said valve body into said conduits, by fluctuations in pressure incident to the operation of said engine, and said plug valve may be turned to close one of said discharge branches while maintaining the other in communication with said vertical branch.

In testimony whereof, I have hereunto signed my name at Glenside, Pennsylvania, this 10th day of August, 1918.

ORSON W. DOOLITTLE.

Witnesses:
    Geo. N. Whitaker,
    Geo. W. Pletscher.